United States Patent [19]
Brunelle et al.

[11] Patent Number: 5,767,225
[45] Date of Patent: Jun. 16, 1998

[54] HIGH MELTING FAST CRYSTALLIZING COPOLYMER COMPOSITIONS

[75] Inventors: Daniel Joseph Brunelle, Burnt Hills; Judith Ann Serth-Guzzo, Niskayuna, both of N.Y.

[73] Assignee: General Electric Company, Schenectady, N.Y.

[21] Appl. No.: 851,232

[22] Filed: May 5, 1997

[51] Int. Cl.⁶ ............................................. C08G 64/00
[52] U.S. Cl. ..................... 528/196; 528/190; 528/192; 528/193
[58] Field of Search ..................... 528/190, 192, 528/193, 196

[56] References Cited

U.S. PATENT DOCUMENTS 4,920,200   4/1990   Brunelle et al. ..................... 528/370

OTHER PUBLICATIONS

Sun & Chang, Journal of Polymer Science: Parat A: Polymer Chemistry, vol. 31, pp. 2711–2719 (1993), Studies on the Thermotropic Liquid Crystalline Polycarbonates. III. Synthesis and Properties of Fully Aromatic Liquid Crystalline Polycarbonates.

Brunelle et al., Macromol. Symp. 77, pp. 117–124 (1994), "Preparation of Crystalline and Solvent Resistant Polycarbonates Via Ring-Opening Polymerization of Cyclic Oligomers".

Brunelle, Reprints from Elsevier Trends Journals, TRIP vol. 3, No. 5, May 1995, pp. 154–158, "Solvent–Resistant Polycarbonates".

*Primary Examiner*—Terressa Mosley
*Attorney, Agent, or Firm*—Vinit G. Kathardekar; Noreen C. Johnson

[57] ABSTRACT

Disclosed are copolycarbonate compositions comprising structural units of Formula I

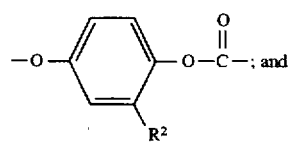

Formula II

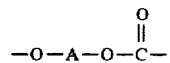

wherein $R^2$ represents $-CH_3$, $-C_2H_5$, or propyl; A is a divalent organic moiety; and wherein the ratio of Formula I to Formula II in the copolycarbonate is from about 99.8:0.2 to about 90:10.

11 Claims, No Drawings

HIGH MELTING FAST CRYSTALLIZING COPOLYMER COMPOSITIONS

FIELD OF INVENTION

The invention relates to novel, solvent resistant, high melting, fast crystallizing, copolymer compositions.

BACKGROUND OF THE INVENTION

Coploymers have been used as the material to make the various parts used in the auto and aeronautical industry for various applications. Many of the applications involve performing various mechanical and other functions at high temperatures. Thus polymers used to prepare parts that are used under the hood of a car need to be high melting and fast crystallizing so that they are capable of molding quickly. Such ploymers also need to be resistant to various solvents.

Solvent-resistant semi-crystalline polycarbonates of hydroquinone (HQ) and bisphenol-A (BPA) have been disclosed in U.S. Pat. No. 4,920,200. This patent reports these polycarbonates to generally have melting points higher than about 300° C. The high molecular weight polycarbonates were prepared via ring opening polymerization of cyclic oligomeric carbonate intermediates. These polycarbonates however are not fast crystallizing.

Lower molecular weight polycarbonates with bisphenols and other monomers have been disclosed by S-J Sun and T-C Chang, *Journal of Polymer Science*, Part A, Polymer Chem. 31, 2711 (1993). All polycarbonates were isolated as hard semi-crystalline or amorphous materials. These terpolymers are utilized for liquid crystalline polymer applications. These polymers however seem to lack the desired solvent resistance necessary for use in the auto and aeronautical industries.

There is thus a need for polymers that have a high melting point so they can withstand high temperatures such as under the hood of a car, be solvent resistant and be fast crystallizing.

SUMMARY OF THE INVENTION

As discussed above the prior art teaches copolymers that are solvent resistant, or having a high melting point. Copolymers that are high melting, solvent resistant and fast crystallizing are desirable for making parts used at elevated temperatures in the auto, aeronautical and other industries. It has been surprisingly found that copolymers of the instant invention possess the high melting, solvent resistance and fast crystallizing properties.

Keeping the needs discussed above in mind the instant invention discloses a copolycarbonate composition comprising structural units of

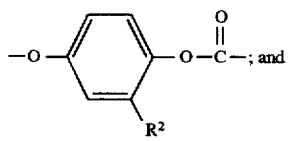

Formula I

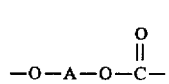

Formula II wherein $R^2$ represents —$CH_3$, —$C_2H_5$, or propyl; A is a divalent organic moiety; and wherein the ratio of formula I to formula II in the copolycarbonate is from about 99.8:0.2 to about 90:10.

Another embodiment of the present invention provides a process to make a copolycarbonate comprising the structural units of

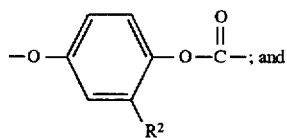

Formula I

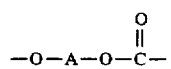

Formula II wherein $R^2$ represents $CH_3$, —$C_2H_5$, or propyl; and A is a divalent organic moiety; comprising the steps of: (a) combining an alkyl hydroquinone, dihydroxyaromatic, diarylcarbonate, and a base catalyst to form a mixture; and (b) melting the mixture at temperatures beginning from about 150° C. to about 325° C., under an inert atmosphere and under reduced pressure of up to about 0.1 mm Hg, to form a copolycarbonate comprising the structural units of Formula I and Formula II.

DETAILED DESCRIPTION OF THE INVENTION

One embodiment of the instant invention provides a copolycarbonate composition comprising structural units of

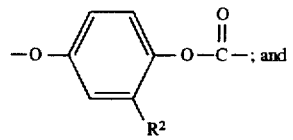

Formula I

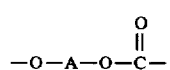

Formula II wherein $R^2$ represents —$CH_3$, —$C_2H_5$, or propyl; A is a divalent organic moiety; and wherein the ratio of formula I to formula II in the copolycarbonate is from about 99.8:0.2 to about 90:10.

A preferred embodiment of the instant invention provides a copolycarbonate wherein $R^2$ is —$CH_3$; and A is

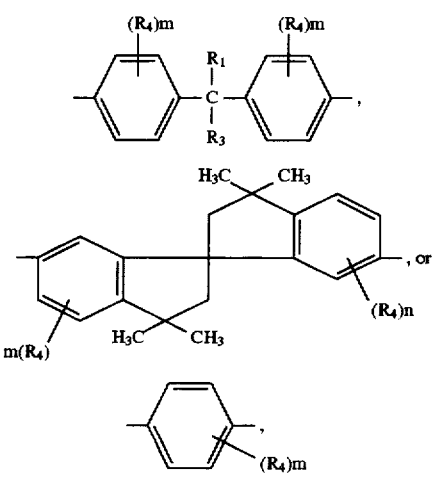

wherein each of $R^1$ and $R^3$ is a $C_{1-4}$ primary or secondary alkyl, or a $C_{6-10}$ aromatic hydrocarbon radical, $R^4$ is $C_{1-4}$ primary or secondary alkyl, or halo; m is 0–4; and n is 0–3;

with the proviso that when A is

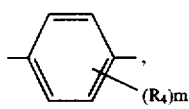

$R^2$ cannot be the same as $R^4$.

In a preferred embodiment A is

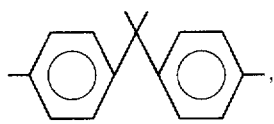

resorcinol, hydroquinone, 4,4'-dihydroxybiphenyl, bis(4-hydroxyphenyl)ether, or bis(4-hydroxyphenyl)sulfide.

In another embodiment of the instant invention is provided a crystalline copolycarbonate having a melting point of at least about 250° C., with a melting point in the range of about 275° C. to about 325° C. being preferred.

Another embodiment of the present invention provides a process to make a copolycarbonate comprising the structural units of

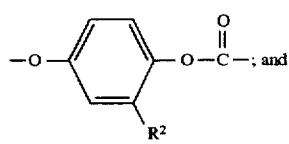 Formula I

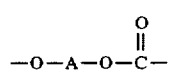 Formula II wherein $R^2$ represents $CH_3$, $-C_2H_5$, or propyl; A is a divalent organic moiety; comprising the steps of: (a) combining an alkyl hydroquinone, dihydroxyaromatic, diarylcarbonate, and a base catalyst to form a mixture; and (b) melting the mixture at temperatures beginning from about 150° C. to about 325° C., under an inert atmosphere and under reduced pressure of up to about 0.1 mm Hg, to form a copolycarbonate comprising the structural units of Formula I and Formula II.

In a preferred embodiment is provided a process wherein A is

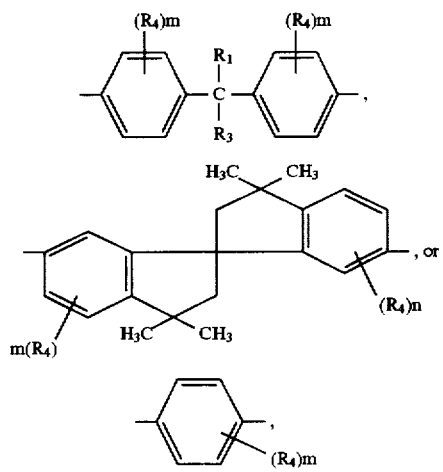

wherein each of $R^1$ and $R^3$ is a $C_{1-4}$ primary or secondary alkyl, or a $C_{6-10}$ aromatic hydrocarbon radical, $R^4$ is $C_{1-4}$ primary or secondary alkyl, or halo; m is 0–4; and n is 0–3, with the proviso that when A is

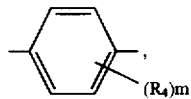

$R^2$ cannot be the same as $R^4$.

In one embodiment is provided a process wherein the base catalyst is an organic or inorganic compound. In a preferred embodiment is provided a process wherein the base catalyst is selected from alkali hydroxides, alkali carbonates, quaternary ammonium hydroxides, quaternary ammonium carbonates, sodium methylates, sodium borohydride, pentamethyl piperidine, alkali metal phenoxides, quaternary ammonium tetraaryl borates, phosphonium carbonates, and phosphonium tetraaryl borates. In a further preferred embodiment the base catalyst is selected from tetraalkyl ammonium hydroxide, tetraalkyl phosphonium hydroxide, and alkali metal hydroxides. In yet another preferred embodiment the source of the carbonate functionality is selected from substituted or unsubstituted phenyl carbonate. Yet another preferred process is one wherein the ratio of alkyl hydroquinone to BPA ranges from about 99.8:0.2 to about 90:10.

EXPERIMENTAL

The copolycarbonate compositions of the instant invention were prepared by the general procedures outlined below. These copolycarbonates were prepared via a chlorophenylcarbonate route or via a diphenylcarbonate route.

Chlorophenylcarbonate Route

Two copolycarbonate compositions with 2.5 and 5.0 mole % bisphenol-A and methylhydroquinone were prepared via melt transesterification using o-chlorophenyl carbonate as the transesterification agent. $Bu_4NBPh_4$ was used as the catalyst. The prepolymer was prepared where approximately 90 wt % of chlorophenol was distilled. Polymerization of the prepolymer was performed in a heated 1 L helicone under vacuum.

EXAMPLE 1

5 mole % BPA/MeHQ

Methylhydroquinone (1.9 moles, 235.87 g), bisphenol-A (0.1 moles, 22.83 g), chlorophenyl carbonate (2.04 moles, 577.12 g) and tetrabutylammonium tetraphenylborate (1.6 mmol, 0.899 g) were added to a 1 L 3-neck flask and melted at 165° C. with overhead stirring. 85 wt % chlorophenol (3.38 mole, 350 mL,) was collected by distillation at about 220° C. followed by a slight vacuum at 230° C. The molten prepolymer was quickly poured onto a foil-lined pyrex dish to obtain a solid (369 g). Subsequent polymerization took place in a 2CV Helicone reactor (500 mL capacity). The prepolymer (200 g) was added at 300° C. and stirred slowly until molten. Once molten, vacuum was applied and the system heated to about 325° C. (stirrer setting=6.5). After about 10 minutes, the vacuum reached about 2.5 mm Hg. The polymer was extruded after 25 minutes to obtain about 122 g of light pink strands (flexible in clear areas and brittle in cloudy areas).

EXAMPLE 2

Procedure for 2.5 mole % BPA/MeHQ

Methylhydroquinone (1.95 moles, 242.1 g), bisphenol-A (0.05 moles, 11.41 g), chlorophenyl carbonate (2.06 moles, 582.8 g) and tetrabutylammonium tetraphenylborate (1.6 mmol, 0.899 g) were added to a 1L 3-neck flask and melted at 165° C. with overhead stirring. 89 wt % chlorophenol (3.52 mole, 365 mL) was collected by distillation at about 220° C. followed by a slight vacuum at 230° C. The molten prepolymer was quickly poured onto a foil-lined pyrex dish to obtain a solid (370 g). Subsequent polymerization took place in a 2CV Helicone reactor (500 mL capacity). The prepolymer (200 g) was added at 300° C. and stirred slowly until molten. Once molten, vacuum was applied and the system heated to 330° C. (stirrer setting=7.5). After about 10 minutes, the vacuum reached about 2.0 mm Hg. The polymer was extruded after about 20 minutes to obtain about 120 g of brittle light pink strands (flexible in clear areas and brittle in cloudy areas).

Diphenylcarbonate Route

The following reactions were performed in a melt reactor. Methylhydroquinone was stirred with silica gel in hot toluene, then recrystallized from toluene. Pure forms of bisphenol A and diphenyl carbonate (DPC) were used. An 8 mole % excess of DPC was used in all polymerizations. The catalyst system used for all reactions was tetramethylammonium hydroxide (TMAH) ($2.7 \times 10^{-4}$ moles) and sodium hydroxide ($2.5 \times 10^{-7}$ moles). After the starting materials were melted at about 180° C., each system underwent up to a series of 11 carefully controlled steps where the temperature was gradually increased and the pressure lowered, as illustrated in Table 1 below. In most runs, a 10 wt % excess of a yellow distillate (phenol+diphenylcarbonate) was collected. Gas chromatography indicated only a small amount of methylhydroquinone in the distillate.

EXAMPLE 3

Procedure for 5 mole % BPA/MeHQ

To a 1 L glass reaction vessel, methylhydroquinone (1.045 moles, 129.73 g), bisphenol-A (0.055 moles, 12.56 g) and diphenyl carbonate (1.19 moles, 254.50 g) were added. The system was purged and backfilled with nitrogen three times. The system was heated to about 180° C. to melt the material and stirring began. The molten liquid was light yellow. The catalysts were added (TMAH followed by NaOH) via a syringe. The system underwent all 11 segments shown in Table 1. After about 3 hours, the polymer was stranded to give between 96–100 g of stranded polymer. Four batches were prepared.

EXAMPLE 4

Procedure for 2.5 mole % BPA/MeHQ

To a 1 L glass reaction vessel, methylhydroquinone (1.07 moles, 133.14 g), bisphenol-A (0.03 moles, 6.28 g) and diphenyl carbonate (1.19 moles, 254.50 g) were added. The system was purged and backfilled with nitrogen three times. After heating the system to about 180° C., the system underwent a modified series of the 11 segments described in Table 1 where Segments 7 and 9 were shortened to about 5 minutes and the temperature for Segment 11 was 310° C. After a total of almost 3 hours, the polymer was stranded to give about 124 g and about 132 g each for two batches.

EXAMPLE 5

Procedure for 1 mole % BPA/MeHQ

To a 1 L glass reaction vessel, methylhydroquinone (1.089 moles, 135.19 g), bisphenol-A (0.011 moles, 2.51 g) and diphenyl carbonate (1.19 moles, 254.50 g) were added. After heating the system to 180° C., the system underwent a modified series of the 11 segments shown in Table 1, where Segments 7 and 9 were shortened to about 5 minutes and the temperature for Sement 11 was 320° C. After a total of about 3–4 hours, the polymer was stranded to give about 92 g and about 104 g each for two batches. (GC analysis of the 1% BPA distillate: 80% phenol, 13% DPC and 1% MeHQ).

EXAMPLE 6

Procedure for 100% MeHQ

To a 1 L glass reaction vessel, methylhydroquinone (1.2 moles, 148.97 g) and diphenyl carbonate (1.29 moles, 277.63 g) were added. After heating the system to about 180° C., the system underwent Segments 1 through 5 and then skipped to Sement 11. After about 2 hours, the polymer crystallized at about 270° C. when about 90 wt % phenol had evolved. The solidified polymer could not be stranded.

TABLE 1

Temperature/Pressure Profile for Melt Reactor

| Segment | Temperature (°C.) | Pressure (mm Hg) | Time (min) |
|---|---|---|---|
| 1 | 180 | atm. | 0 |
| 2 | 180 | atm. | 5 |
| 3 | 180–210 | atm–175 | 5 |
| 4 | 210 | 175 | 35 |
| 5 | 210 | 100 | 35 |
| 6 | 210–240 | 100–15 | 5 |
| 7 | 240 | 15 | 40 |
| 8 | 240–270 | 15–10 | 5 |
| 9 | 270 | 10 | 20 |
| 10 | 270–300 | 10–0.1 | 5 |
| 11 | 300 | 0.1 | 30 |

The table lists the temperature/pressure profile that the reactants were maintained at in the melt reactor. Optimum results were obtained when the reactants were maintained at conditions outlined in one or more of the above segments. The examples provided are for illustrative purposes only and it is understood that one skiled in the art is aware of the experimental variations necessary to obtain similar results.

The fast crystallizing property of the copolymers of the instant invention is evident from the AHm(J/g) values listed in Table 2.

TABLE 2

| Example | $\Delta H_m$ (J/g) | Tm (°C.) |
|---|---|---|
| 1 | 46 | 299 |
| 2 | 45 | 292 |
| 3 | 45 | 282 |
| 4 | 54 | 292 |
| 5 | 42 | 286 |
| 6 | 51 | 291 |

$\Delta H_m$ represents the heat of melting, thus a $\Delta H$ of higher than about 25 indicates the fast crystallization nature of the copolymer. The $\Delta H_m$ values listed above are clearly higher for the copolymers of the instant invention when compared to the $\Delta H_m$ values of hydroquinone/bisphenol A copolymers which are typically about 10–15.

The term high melting, as used herein, indicates a melting point higher than 250° C., the term fast crystallizing means that the copolymer has a heat of melting ($\Delta H_m$) of at least about 25. Also as used herein the term solvent resistant

What is claimed is:

1. A copolycarbonate comprising structural units of

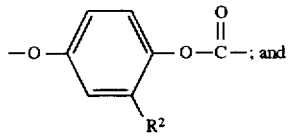; and

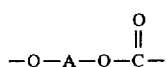

wherein
R² represents —CH₃, —C₂H₅, or propyl; A is a divalent organic moiety; and
wherein the ratio of Formula I to Formula II in the copolycarbonate is from about 99.8:0.2 to about 90:10.

2. A copolycarbonate of claim 1 wherein R² is —CH₃; and A is

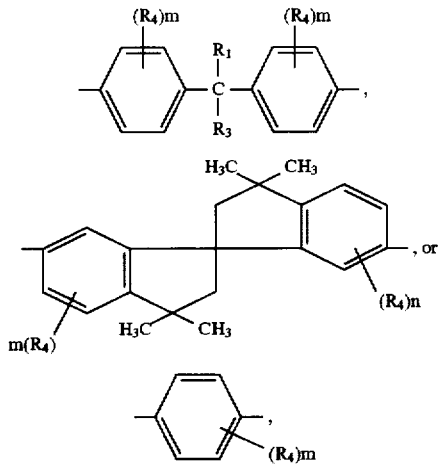

wherein each of R¹ and R³ is a C$_{1-4}$ primary or secondary alkyl, or a C$_{6-10}$ aromatic hydrocarbon radical, R⁴ is C$_{1-4}$ primary or secondary alkyl, or halo; m is 0–4; and n is 0–3, with the proviso that when A is

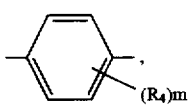

R² cannot be the same as R⁴.

3. A copolycarbonate of claim 2 wherein A is

resorcinol, hydroquinone, 4,4'-dihydroxybiphenyl, bis(4-hydroxyphenyl)ether, or bis(4-hydroxyphenyl)sulfide.

4. A copolycarbonate of claim 3 having a melting point of at least about 260° C.

5. A copolycarbonate of claim 4 having a melting point in the range of about 275° C. to about 325° C.

6. A process to make a copolycarbonate comprising the structural units of

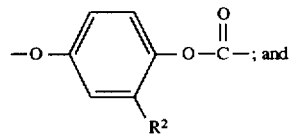 Formula I

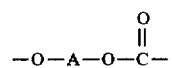 Formula II wheein
R² represents CH₃, —C₂H₅, or propyl; A is a divalent organic moiety; comprising the steps of:
  (a) combining an alkyl hydroquinone, dihydroxyaromatic, diarylcarbonate, and a base catalyst to form a mixture; and
  (b) melting the mixture at temperatures beginning from about 150° C. to about 325° C., under an inert atmosphere and under reduced pressure of up to about 0.1 mm Hg to form a copolycarbonate comprising the structural units of Formula I and Formula II.

7. A process of claim 6 wherein the A is

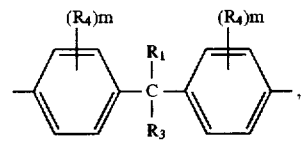

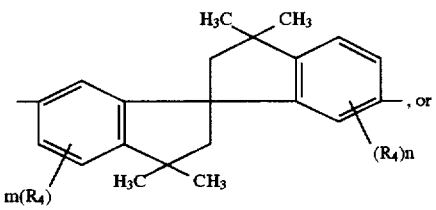

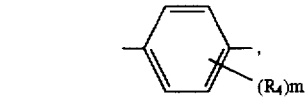

wherein each of R¹ and R³ is a C$_{1-4}$ primary or secondary alkyl, or a C$_{6-10}$ aromatic hydrocarbon radical, R⁴ is C$_{1-4}$ primary or secondary alkyl, or halo; m is 0–4; and n is 0–3, with the proviso that when A is

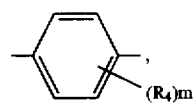

R² cannot be the same as R⁴.

8. A process of claim 7 wherein the base catalyst is an organic or inorganic compound.

9. A process of claim 8 wherein the base catalyst is selected from alkali hydroxides, alkali carbonates, quaternary ammonium hydroxides, quaternary ammonium carbonates, sodium methylates, sodium borohydride, pentamethyl piperidine, alkali metal phenoxides, quaternary ammonium tetraaryl borates, phosphonium carbonates, and phosphonium tetraaryl borates.

10. A process of claim 6 wherein the diarylcarbonate is selected from substituted or unsubstituted phenyl carbonate.

11. A process of claim 8 wherein the ratio of alkyl hydroquinone to BPA ranges from about 99.8:0.2 to about 90:10.

* * * * *